(12) United States Patent
McCune et al.

(10) Patent No.: US 8,894,538 B2
(45) Date of Patent: Nov. 25, 2014

(54) GAS TURBINE ENGINE WITH GEARED ARCHITECTURE

(75) Inventors: Michael E. McCune, Colchester, CT (US); Lawrence E. Portlock, Bethany, CT (US); Frederick M. Schwarz, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/484,722

(22) Filed: May 31, 2012

(65) Prior Publication Data

US 2012/0237335 A1 Sep. 20, 2012

Related U.S. Application Data

(63) Continuation of application No. 13/346,120, filed on Jan. 9, 2012, which is a continuation of application No. 11/504,220, filed on Aug. 15, 2006, now Pat. No. 8,753,243.

(51) Int. Cl.
*F16H 57/08* (2006.01)
*F01D 5/02* (2006.01)
*F02C 7/36* (2006.01)

(52) U.S. Cl.
CPC ............ *F01D 5/027* (2013.01); *F05D 2220/36* (2013.01); *F05D 2260/4031* (2013.01); *F05D 2260/34* (2013.01); *F02C 7/36* (2013.01); *F05D 2220/323* (2013.01); *F05D 2260/40311* (2013.01); *F05D 2240/70* (2013.01)
USPC ............................ 475/331; 475/346; 475/347

(58) Field of Classification Search
USPC .......................................... 475/331, 346, 347
See application file for complete search history.

(56) References Cited

U.S. PATENT DOCUMENTS

| | | | |
|---|---|---|---|
| 2,684,591 A | | 7/1954 | Lundquist |
| 3,160,026 A | | 12/1964 | Rosen |
| 3,352,178 A | | 11/1967 | Lindgren et al. |
| 3,722,323 A | | 3/1973 | Welch |
| 4,583,413 A | | 4/1986 | Lack |
| 4,896,499 A | * | 1/1990 | Rice ................................ 60/792 |
| 5,081,832 A | * | 1/1992 | Mowill ........................... 60/792 |
| 5,211,541 A | | 5/1993 | Fledderjohn et al. |
| 5,302,031 A | | 4/1994 | Yuasa |
| 5,391,125 A | | 2/1995 | Turra et al. |
| 5,433,674 A | * | 7/1995 | Sheridan et al. .............. 475/346 |
| 5,466,198 A | | 11/1995 | McKibbin et al. |
| 5,472,383 A | | 12/1995 | McKibbin |

(Continued)

FOREIGN PATENT DOCUMENTS

| | | |
|---|---|---|
| CN | 1952435 A | 4/2007 |
| EP | 1114949 | 7/2001 |

(Continued)

OTHER PUBLICATIONS

Japanese Office Action for Japanese Application No. 2007-202444, Aug. 3, 2010.

(Continued)

*Primary Examiner* — Derek D Knight
(74) *Attorney, Agent, or Firm* — Carlson, Gaskey & Olds, P.C.

(57) ABSTRACT

A geared architecture with a flex mount for a fan drive gear system.

12 Claims, 2 Drawing Sheets

(56) References Cited

U.S. PATENT DOCUMENTS

| | | | |
|---|---|---|---|
| 6,223,616 B1 * | 5/2001 | Sheridan | 475/159 |
| 6,402,654 B1 | 6/2002 | Lanzon et al. | |
| 6,530,858 B1 | 3/2003 | Usoro et al. | |
| 6,669,597 B1 | 12/2003 | Usoro et al. | |
| 6,732,502 B2 * | 5/2004 | Seda et al. | 60/226.1 |
| 7,021,042 B2 | 4/2006 | Law | |
| 7,591,754 B2 | 9/2009 | Duong et al. | |
| 7,662,059 B2 | 2/2010 | McCune | |
| 7,704,178 B2 * | 4/2010 | Sheridan et al. | 475/159 |
| 8,074,440 B2 | 12/2011 | Kohlenberg | |
| 2002/0064327 A1 | 5/2002 | Toda et al. | |
| 2004/0112041 A1 * | 6/2004 | Law | 60/226.1 |
| 2005/0026745 A1 | 2/2005 | Mitrovic | |
| 2008/0006018 A1 | 1/2008 | Sheridan et al. | |
| 2008/0044276 A1 | 2/2008 | McCune et al. | |
| 2008/0096714 A1 | 4/2008 | McCune | |
| 2008/0116009 A1 | 5/2008 | Sheridan et al. | |
| 2009/0056306 A1 | 3/2009 | Suciu et al. | |
| 2009/0081039 A1 | 3/2009 | McCune et al. | |
| 2009/0090096 A1 | 4/2009 | Sheridan | |
| 2009/0111639 A1 | 4/2009 | Klingels | |
| 2009/0293278 A1 | 12/2009 | Duong et al. | |
| 2009/0298640 A1 | 12/2009 | Duong et al. | |
| 2011/0130246 A1 | 6/2011 | McCune | |

FOREIGN PATENT DOCUMENTS

| | | |
|---|---|---|
| EP | 1876338 A2 | 1/2008 |
| EP | 2224100 | 9/2010 |
| EP | 2559913 A1 | 2/2013 |
| FR | 1357038 | 4/1964 |
| JP | 46-36927 | 10/1971 |
| JP | 5-248267 A | 9/1993 |
| JP | 9-317833 A | 12/1997 |
| JP | 2001-208146 A | 8/2001 |
| JP | 39-20031 B2 | 5/2007 |

OTHER PUBLICATIONS

European Search Report for EP Application No. 07253078.5, Dec. 5, 2007.
Kandebo; Geared-Turbofan Engine Design Targets Cost, Complexity, Aviation Week & Space Technology; New York; Feb. 23, 1998, 4 pp.
Hendricks et al, "Performance and Weight Estimates for an Advanced Open Rotor Engine" NASA/TM-2012-217710, Sep. 2012, 20 pp.
Gunston, "Jane's Aero-Engines" Pratt & Whitney/USA, Mar. 2000, JAEng-Issue 7, 5 pp.
Zalud, "Gears Put a New Spin on Turbofan Performance" Machine Design, Nov. 5, 1998, 2010Penton Media, Inc., 5 pp.
European Search Report and Written Opinion for European Application No. EP 12 19 8136 completed on Aug. 21, 2013.
International Search Report and Written Opinion for International Application No. PCT/US2012/071906 completed on Aug. 22, 2013.
Dudley ("Gear Handbook: The design, Manufacture, and Application of Gears", p. 3-15).
Meier, N. (2005). Civil Turbojet/Turbofan Specifications. Retrieved from http://www.jet-engine.net/civtfspec.html.
International Preliminary Report on Patentability for PCT Application No. PCT/US2012/071906 mailed Jul. 24, 2014.

* cited by examiner

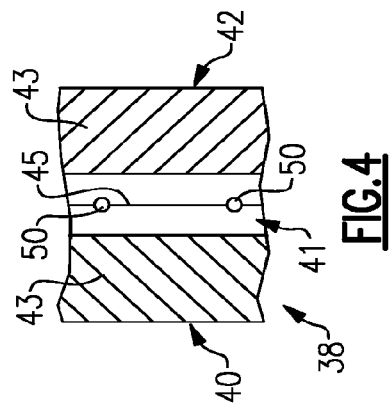
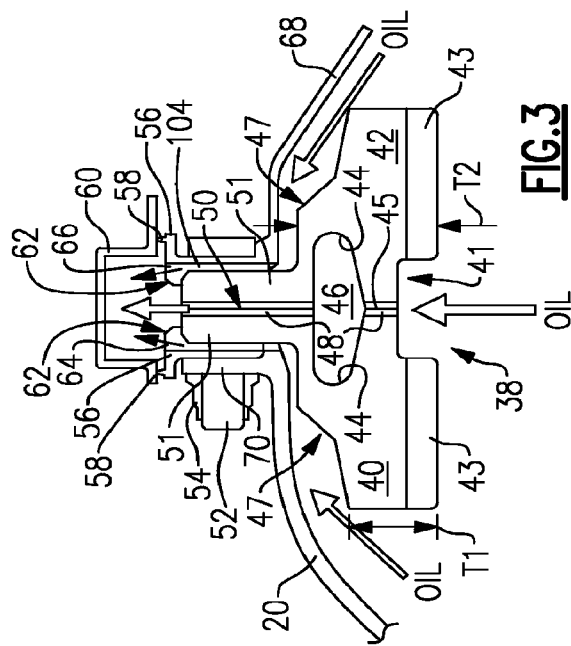

GAS TURBINE ENGINE WITH GEARED ARCHITECTURE

CROSS REFERENCE TO RELATED APPLICATIONS

The present disclosure is a continuation of U.S. patent application Ser. No. 13/346,120, filed Jan. 9, 2012, which is a continuation in part of U.S. application Ser. No. 11/504,220, filed Aug. 15, 2006 now U.S. Pat. No. 8,753,243.

BACKGROUND OF THE INVENTION

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY OF THE INVENTION

A geared architecture for a gas turbine engine according to an exemplary aspect of the present disclosure includes a fan shaft, a frame which supports the fan shaft, a gear system which drives the fan shaft, a torque frame which at least partially supports the gear system, and an input coupling to the gear system.

In a further non-limiting embodiment of the foregoing geared architecture, the frame and the torque frame are mounted to a fixed structure.

In a further non-limiting embodiment of the foregoing geared architecture, the frame and the torque frame are mounted to a front center body of a gas turbine engine.

In a further non-limiting embodiment of the foregoing geared architecture, the torque frame is mounted to a planet carrier of the gear system.

In a further non-limiting embodiment of the foregoing geared architecture, the input coupling is mounted to a sun gear of the gear system.

In a further non-limiting embodiment of the foregoing geared architecture, the fan shaft is mounted to a ring gear of the gear system.

In a further non-limiting embodiment of the foregoing geared architecture, the gear system is a star In a further non-limiting embodiment of the foregoing geared architecture, the torque frame is mounted to a ring gear of the gear system.

In a further non-limiting embodiment of the foregoing geared architecture, the input coupling is mounted to a sun gear of the gear system.

In a further non-limiting embodiment of the foregoing geared architecture, the fan shaft is mounted to a star carrier of the gear system.

In a further non-limiting embodiment of the foregoing geared architecture, the gear system is a planet system.

In a further non-limiting embodiment of the foregoing geared architecture, a bypass flow defines a bypass ratio greater than about ten (10).

In a further non-limiting embodiment of the foregoing geared architecture, system includes a gear train that defines a gear reduction ratio of greater than or equal to about 2.3.

In a further non-limiting embodiment of the foregoing geared architecture, the system includes gear train that defines a gear reduction ratio of greater than or equal to about 2.5.

In a further non-limiting embodiment of the foregoing geared architecture, the comprising a low pressure turbine, wherein the low pressure turbine defines a pressure ratio that is greater than about five (5).

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is an enlarged cross-sectional view of the epicyclic gear train shown in FIG. 1.

FIG. 3 is an enlarged cross-sectional view of an example ring gear similar to the arrangement shown in FIG. 2.

FIG. 4 is a view of the ring gear shown in FIG. 3 viewed in a direction that faces the teeth of the ring gear in FIG. 3.

DETAILED DESCRIPTION OF THE PREFERRED EMBODIMENT

Figure 1:
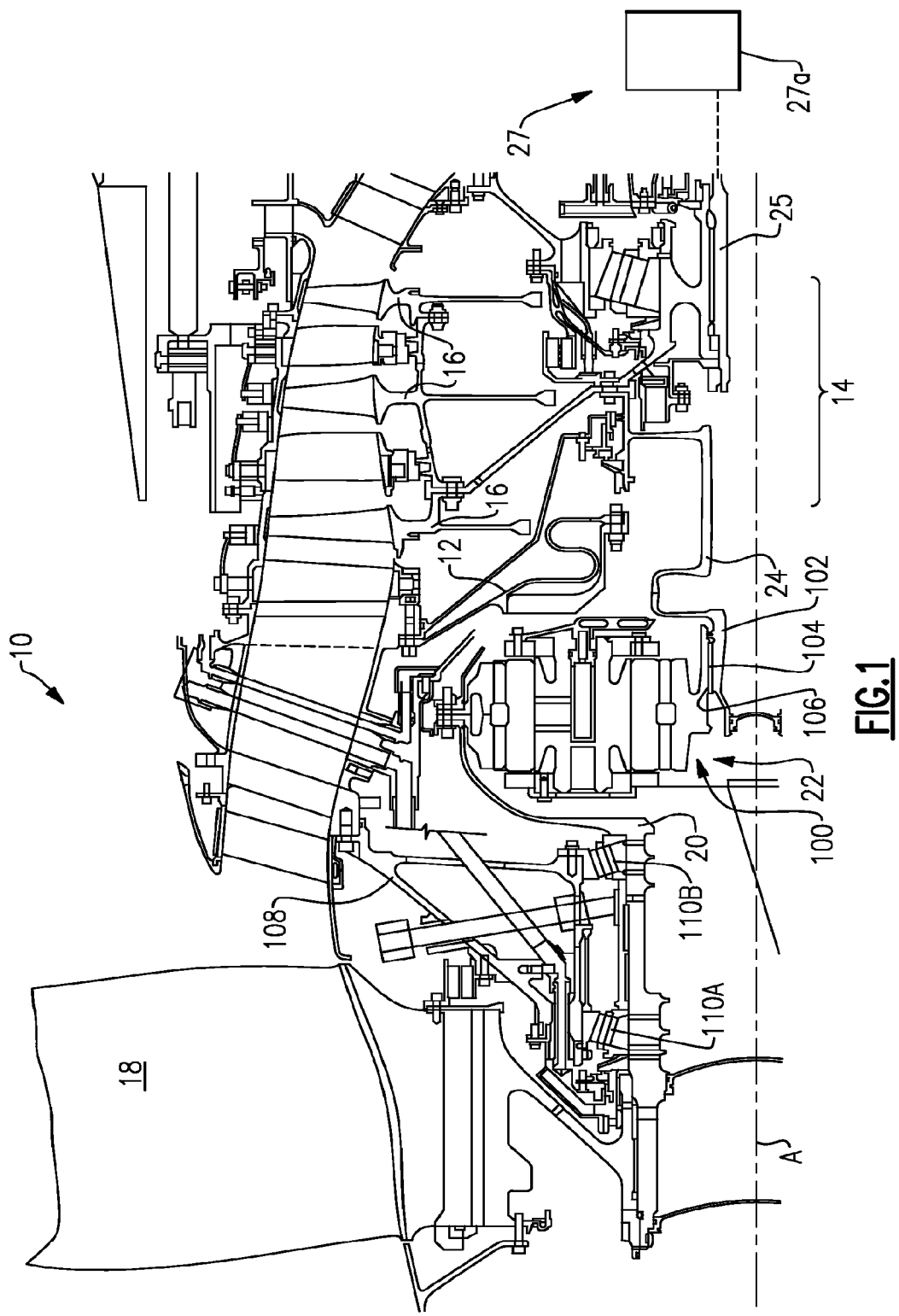
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 and turbine section 27 about an axis A. A turbo fan 18 is supported on a turbo fan shaft 20 that is driven by a compressor shaft 24, which supports the compressor hubs 16, through an epicyclic gear train 22. The engine 10 is a high-bypass geared architecture aircraft engine. In one disclosed, non-limiting embodiment, the engine 10 bypass ratio is greater than about six (6) to ten (10), the gear train 22 is an epicyclic gear train such as a planetary gear system or other gear system with a gear reduction ratio of greater than about 2.3 and a low pressure turbine 27*a* of the turbine section 27 has a pressure ratio that is greater than about 5. The engine 10 in one non-limiting embodiment is a high-bypass geared architecture aircraft engine. In one disclosed embodiment, the engine 10 bypass ratio is greater than ten (10:1), the turbofan diameter is significantly larger than that of the low pressure compressor 16, and the low pressure turbine 27a has a pressure ratio that is greater than 5:1. The gear train 22 may be an epicycle gear train such as a planetary gear system or other gear system with a gear reduction ratio of greater than 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan 18 of the engine 10 is designed for a particular flight condition—typically cruise at about 0.8M and about 35,000 feet. The flight condition of 0.8 M and 35,000 ft, with the engine at its best fuel consumption—also known as "bucket cruise TSFC"—is the industry standard parameter of lbm of fuel being burned divided by lbf of thrust the engine produces at that minimum point. "Low fan pressure ratio" is the pressure ratio across the fan blade alone, without the FEGV system 36. The low fan pressure ratio as disclosed herein according to one non-limiting embodiment is less than 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than 1150 ft/second.

The gear train 22 generally includes a fan drive gear system (FDGS) 100 driven by the compressor shaft 24 through an input coupling 102. The input coupling 102 both transfers torque from the compressor shaft 24 to the gear train 22 and facilitates the segregation of vibrations and other transients therebetween.

The input coupling 102 may include an interface spline 104 joined, by a gear spline 106, to the sun gear 30. The sun gear 30 is in meshed engagement with multiple star gears 32. Each star gear 32 is also in meshed engagement with rotating ring gear 38 that is mechanically connected to the fan shaft 20. Since the star gears 32 mesh with both the rotating ring gear 38 as well as the rotating sun gear 30, the star gears 32 rotate about their own axes to drive the ring gear 38. The rotation of the ring gear 38 is conveyed to the fan 20 through the fan shaft 20 to thereby drive the fan 18 at a lower speed than the turbine shaft 25.

In the example arrangement shown, the epicyclic gear train 22 is a star gear train. Referring to FIG. 2, the epicyclic gear train 22 includes the sun gear 30 that is connected to the compressor shaft 24, which provides rotational input, by the splined connection. A carrier 26 is fixed to the housing 12 by a torque frame 28 using fingers 31 (shown schematically) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below.

The torque frame 28 supports the carrier 26 with respect to the housing 12 such as a front center body which facilitates the segregation of vibrations and other transients therebetween. It should be understood that various gas turbine engine case structures may alternatively or additionally be provided.

The fixed housing 12 may further include a number 1 and 1.5 bearing support frame 108 which is commonly referred to as a "K-frame" which supports the number 1 and number 1.5 bearing systems 110A, 110B to support the fan shaft 20 (FIG. 1). The number 1 and number 1.5 bearing systems 110A, 110B may include tapered roller bearings which provide a line contact.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A geared architecture for a gas turbine engine comprising:
   a fan shaft and a fan supported on said fan shaft and defining a bypass flow ratio greater than about six;
   a frame which supports said fan shaft;
   a gear system which drives said fan shaft, said gear system having a gear reduction ratio of greater than or equal to about 2.3;

a torque frame which at least partially supports said gear system;

an input coupling to said gear system; and a low pressure turbine coupled to rotatably drive said input coupling, said low pressure turbine defining a pressure ratio that is greater than about five (5).

2. The geared architecture as recited in claim 1, wherein said frame and said torque frame are mounted to a fixed structure.

3. The geared architecture as recited in claim 1, wherein said frame and said torque frame are mounted to a front center body of a gas turbine engine.

4. The geared architecture as recited in claim 1, wherein said torque frame is mounted to a carrier of said gear system.

5. The geared architecture as recited in claim 4, wherein said input coupling is mounted to a sun gear of said gear system.

6. The geared architecture as recited in claim 5, wherein said fan shaft is mounted to a ring gear of said gear system.

7. The geared architecture as recited in claim 6, wherein said gear system is a star system.

8. The geared architecture as recited in claim 1, wherein said gear system is an epicyclic gear train.

9. The geared architecture as recited in claim 1, wherein said bypass flow ratio is greater than about ten (10).

10. The geared architecture as recited in claim 1, wherein said gear reduction ratio is greater than or equal to about 2.5.

11. The geared architecture as recited in claim 1, wherein said gear system includes a carrier supporting intermediate gears that mesh with a sun gear, and a ring gear surrounding and meshing with said intermediate gears, each of said intermediate gears being supported on a respective journal bearing.

12. The geared architecture as recited in claim 11, wherein said input coupling is coupled to the sun gear and said fan shaft is coupled to the ring gear.

\* \* \* \* \*